(12) United States Patent
Kim et al.

(10) Patent No.: US 7,664,374 B2
(45) Date of Patent: Feb. 16, 2010

(54) DIGITAL CONVERGENT RECORDER

(75) Inventors: Dong-Oh Kim, Kyunggi-do (KR);
Hyun-Chul Kim, Kyunggi-do (KR)

(73) Assignee: Kaonmedia Co., Ltd., Kyonggi-do (KR)

( * ) Notice: Subject to any disclaimer, the term of this patent is extended or adjusted under 35 U.S.C. 154(b) by 500 days.

(21) Appl. No.: 10/594,445

(22) PCT Filed: Jul. 12, 2004

(86) PCT No.: PCT/KR2004/001726
§ 371 (c)(1),
(2), (4) Date: Mar. 19, 2007

(87) PCT Pub. No.: WO2005/076272
PCT Pub. Date: Aug. 18, 2005

(65) Prior Publication Data
US 2007/0263989 A1     Nov. 15, 2007

(30) Foreign Application Priority Data
Feb. 7, 2004    (KR) ................. 10-2004-0008185

(51) Int. Cl.
*H04N 5/91* (2006.01)
(52) U.S. Cl. ........................ 386/112; 386/125
(58) Field of Classification Search ............. 386/46, 386/95, 98, 111, 112, 125, 126
See application file for complete search history.

(56) References Cited

U.S. PATENT DOCUMENTS

| | | | |
|---|---|---|---|
| 7,069,332 B2 * | 6/2006 | Shibata et al. | 709/231 |
| 2002/0009283 A1 | 1/2002 | Ichioka et al. | |
| 2003/0135860 A1 | 7/2003 | Dureau | |
| 2005/0158029 A1 * | 7/2005 | Irikuchi et al. | 386/83 |

FOREIGN PATENT DOCUMENTS

| | | |
|---|---|---|
| GB | 2 377 574 A | 1/2003 |
| WO | WO 01/65862 A2 | 9/2001 |
| WO | WO 03/007616 A2 | 1/2003 |

* cited by examiner

*Primary Examiner*—Huy T Nguyen
(74) *Attorney, Agent, or Firm*—Morgan Lewis & Bockius LLP

(57) ABSTRACT

The invention generally relates to a digital convergent recorder. The digital convergent recorder may generate and record into a storage device (e.g. HDD) a first digital data in a first compress format (e.g. MPEG2) out of an external input analog AV signal or a digital broadcasting signal, may generate and transmit via internet to an external computer a second digital data in a second compress format (e.g. M-JPEG) out of the external input analog AV signal or an analog AV signal obtained by decoding the first data from the storage device, and may control the MPEG2 encoding/recording mode responding to a user command received through a specific command/control protocol from the external computer.

7 Claims, 2 Drawing Sheets

DIGITAL CONVERGENT RECORDER

TECHNICAL FIELD

The present invention relates to a digital convergent recorder, where externally input analog audio/video signals and digital broadcast signals are encoded into a common data compression format of, for example, Moving Picture Experts Group-2 Transport Stream and are recorded on a data storage medium such as a hard disk drive, the externally input analog audio/video signals and analog audio/video signals that are generated by reading and decoding from the storage medium are encoded into a Motion-Joint Picture Experts Group compression format to be transmitted to an external computer through the Internet, and such a Moving Picture Experts Group-2 Transport stream encoding/recording mode is controlled in respond to a user command transmitted from the external computer according to a specific command/control protocol.

BACKGROUND ART

Digital Video Recorders (DVRs) are widely installed and used in public places such as schools and banks for the purposes of security and the management of facilities. The DVRs are developed to overcome the technical limitations of a conventional Closed Circuit Television (CCTV) system. That is, in the DVRs, videos captured by cameras are digitized, processed using a digital compression technology and stored in high-capacity Hard Disk Drives (HDDs), so that the problems of the CCTV system, in which recorded videos deteriorate and recording tapes must be periodically replaced, are removed.

Meanwhile, the DVRs are independent systems that do not need compatibility with external systems, but need special functions such as multi-channel division screen construction or time index search, so that the DVRs has generally adopted an independent format of data compression technology. Conventional data compression technologies not only fail to support some functions that needed in the DVRs but also require large additional overhead, so that the DVRs use the independent format.

Meanwhile, Personal Video Recorders (PVR) have been used for the purposes of recording, reproducing and instant recording broadcast signals, and the PVRs are developed to overcome the technical limitations of conventional Video Cassette Recorders (VCRs). That is, the PVRs solve a problem of the deterioration of the image quality of analog VCR tapes by using HDD devices. The instant recording function, in which the HDD devices are used not as storage devices but as a type of a time delay buffer so that live broadcasts may be instantly paused, is PVRs' advanced feature compared to the conventional VCRs.

When classified by the types of broadcast signals, analog-type PVRs convert analog broadcast signals into digital data, compress the digital data into an independent format and store the compressed digital data on a HDD device, whereas digital-type PVRs, being combined with digital STBs, perform both Set Top Box (STB) functions of decoding digital broadcast signals and outputting the decoded signals to an external TV, and PVR functions of storing digital broadcast signals as they are and performing the above-described recording, reproducing and instant recording functions.

As described above, the DVRs and the PVRs perform different functions in independent fields because their applications are totally different. That is, schools and banks do not need the PVRs, whereas homes are not equipped with the DVRs. However, according to the recent trend of digital convergence, if they are combined together, the creation of added value may be expected. Further, demands for home security systems start to increase, so that the demands for such combined devices may be expected. Furthermore, if the combined devices are combined with Internet technology and more various operational scenarios are provided, their commercial values are expected to be much larger.

DETAILED DESCRIPTION OF THE INVENTION

Disclosure of the Invention

Accordingly, an object of the present invention is to provide a digital convergent recorder in which externally input analog A/V signals and digital broadcast signals are encoded into a common data compression format of, for example, Moving Picture Experts Group-2 (MPEG-2) Transport Stream (TS) and recorded on a data storage medium such as a HDD, the externally input analog A/V signals and analog A/V signals that are generated by reading and decoding from the storage medium are encoded into a Motion-Joint Photographic Experts Group (M-JPEG) compression format so as to be transmitted to an external computer through the Internet, and such an MPEG-2 TS encoding/recording mode is controlled in response to a user command transmitted from the external computer according to a specific command/control protocol.

BEST MODE FOR CARRYING OUT THE INVENTION

An embodiment of the present invention is described in detail with reference to the attached drawings below.

Figure 1:
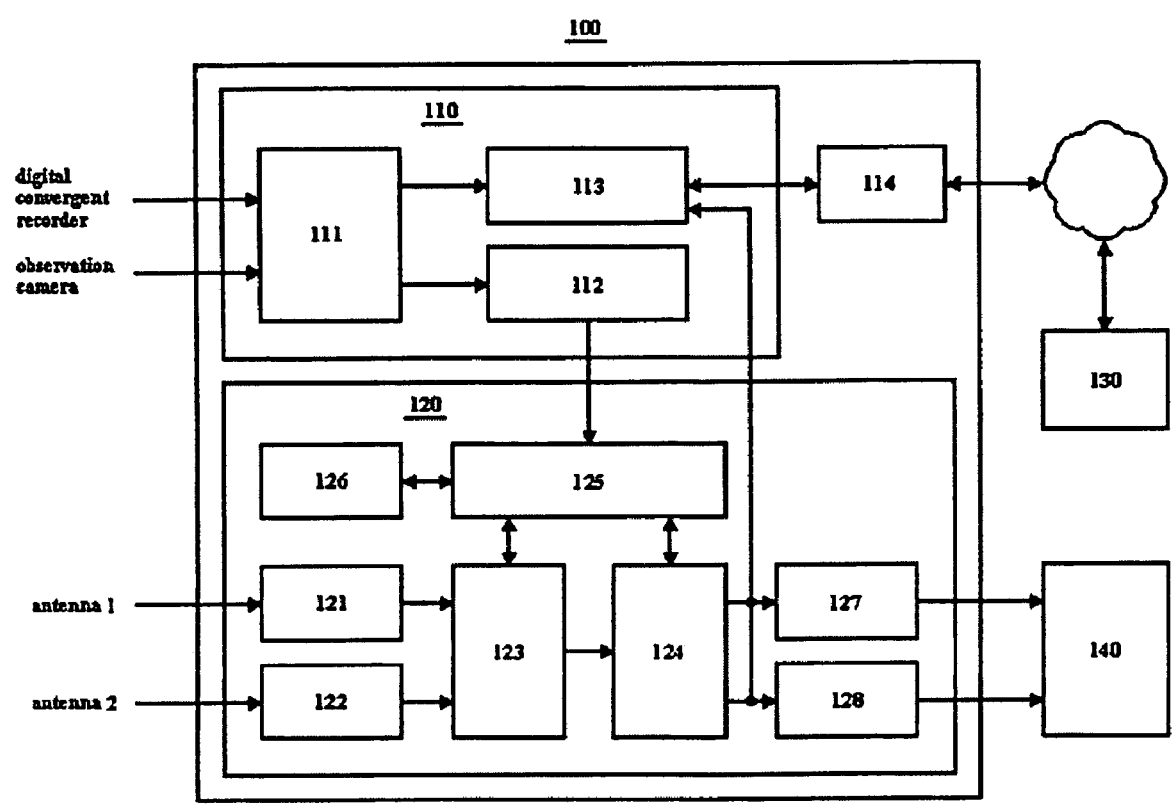
FIG. 1 is a block diagram showing the internal construction of a digital convergent recorder according to an embodiment of the present invention.

FIG. 1 is a block diagram showing the internal construction of a digital convergent recorder 100 according to an embodiment of the present invention. The digital convergent recorder 100 of the present invention basically includes a DVR module 110, a PVR module 120 and a network access module 114. The DVR module 110 is a module for receiving and processing general analog broadcast signals and the video output signals of an external observation camera module from the outside. The PVR module 120 is a module for receiving and processing digital broadcast signals from the outside. The network access module 114 is a module for connecting to the Internet.

First, the DVR module 110 is described in detail. The DVR module 110 receives analog A/V signals from the outside, obtains digital data by digital conversion of the analog A/V signals in an Analog-to-Digital Converter (ADC) 111, and encodes the obtained digital data into, for example, an MPEG-2 TS format in an MPEG encoder 112 and further encodes the obtained digital data into, for example, an M-JPEG format in an M-JPEG encoder 113.

In this case, the compression format for encoding digital data in the MPEG encoder 112 is determined depending on digital broadcast signals processed in the PVR module 120. MPEG-2 TS is widely used as a digital broadcast format, so that the present specification is prepared under the assumption that MPEG-2 TS is used. Furthermore, the compression format for encoding digital data in the M-JPEG encoder 113 is determined depending on a format that is widely used as the transmission standard of moving picture data in an Internet technology. M-JPEG provides the high-resolution compression of broadcasts and is widely used in an Internet broadcasting, so that the present specification is prepared under the assumption that M-JPEG is used. Since the transmission speed of the Internet is low, the M-JPEG encoder 113 is characterized in that the compression ratio thereof is higher than that of the MPEG encoder 112.

Subsequently, the PVR module 120 is described in detail. The PVR module 120 receives digital broadcast signals from the outside through antennas, obtains digital broadcast data in a tuner 121 or 122 according to channel selection, processes limited reception in a Digital Video Broadcast-Common Interface (DVB-CI) 123 depending on the broadcasting provider, and decodes the digital broadcast data in an MPEG decoder 124 according to a corresponding decoding format, so that the uncompressed data of the moving picture is obtained. Subsequently, analog broadcast signals are obtained through the analog conversion of the obtained uncompressed data of the moving picture in A/V Digital-to-Analog Converters (DACs) 127 and 128, thus enabling a user to watch an external Television (TV) 140. Although, in the present specification, the external TV 140 is described as being employed, it is possible to construct the digital convergent recorder and a TV into a single body.

The digital convergent recorder 100 of the present invention is preferably constructed to include a plurality of tuner modules corresponding to different broadcast services so as to enhance the utility of the recorder. However, the present specification describes an embodiment in which dual tuners 121 and 122 are provided. The selection and switching between the plurality of tuner modules may be performed using a remote controller, or may be performed in such a way that a user remotely controls the selection and switching using an external computer 130 via the Internet as will be described later.

The DVB-CI 123 is described in detail. In order to manage pay broadcasts, a broadcasting provider specifically scrambles digital broadcast data. A cryptographic module, which descrambles the scrambled parts of broadcast data so that a user may watch such the pay broadcasts, is the DVB-CI 123. The DVB-CI 123 may be implemented either as a built-in hardware, or as an external insert type according to a Common Interface (CI) standard. Meanwhile, the MPEG decoder 124 is used to decode the digital broadcast data transmitted through the tuners 121 and 122. If the digital broadcast data is compressed into a format other than MPEG, the decoding format used in the MPEG decoder 124 is also determined correspondingly.

The PVR module 120 contains a HDD device 126 to store digital moving picture data, and an Advanced Technology Attachment Packet Interface (ATAPI) 125 controls medium access to the HDD device 126. As shown in the drawing, the paths through which digital moving picture data is transmitted to the ATAPI 125 include the path through which digital broadcast data from the tuners 121 and 122 is transmitted and the path through which digital moving picture data generated in the MPEG encoder 112 is transmitted. The digital convergent recorder of the present invention is characterized in that the compression formats of the digital moving picture data transmitted through the plurality of paths are compatible each other.

As described above, the format used to compress data in the MPEG encoder 112 is determined depending on the digital broadcast signals processed in the PVR module 120, so that moving picture data, provided through the ATAPI 125 and recorded in the HDD device 126, is preferably a single compression format, or compression formats that are closely compatible each other. In case where the digital broadcast signals include a plurality of compression formats, the compression format used in the MPEG encoder 112 may be determined as one of the compression formats, or as compression format in which two or more compression formats are combined. As a result, the digital moving picture data stored in the HDD device 126 may be constructed in a plurality of compression formats. However, whether a single compression format is used and which type of compression format is used are not randomly determined, but are determined based on the digital broadcast signals processed in the PVR module 120.

The digital moving picture data stored in the HDD device 126 is provided to the PVR module 120 via the ATAPI 125. The provided digital moving picture data is decoded in the MPEG decoder 124, converted into an analog form in the A/V DACs 127 and 128, and displayed on an external TV 140 or a built-in monitor. In the present specification, the HDD device 126 is described as a built-in type, but the present specification is not limited to the built-in type. The HDD device 126 may be an external type, and further the present invention may be constructed using a storage medium other than the HDDs.

As described above, the DVB-CI 123 descrambles the scrambled parts of the digital broadcast data. The data that is transmitted to the MPEG decoder 124 for decoding is descrambled data, whereas the data that is transmitted to the HDD device 126 for storing may be constructed either into descrambled data, or the original, i.e. un-descrambled broadcast data. When compared, the former is advantageous for the usability of the digital moving picture data stored in the HDD device 126, whereas the latter is advantageous for the protection of copyright immanent in the digital broadcast signals.

In the case where the data that is transmitted to the HDD device 126 for storing is composed of descrambled data, the digital moving picture data from the HDD device 126 is plaintext data, so that the present embodiment may be constructed in such a way that the digital moving picture data is directly transmitted to and decoded in the MPEG decoder 124. In contrast, in the case where the data that is transmitted to the HDD device 126 for storing is composed of the original, i.e. un-descrambled broadcast data, the digital moving picture data from the HDD device 126 includes scrambled data, so that the present embodiment shall be constructed in such a way that the digital moving picture data is transmitted from the ATAPI 125 to the DVB-CI 123 to be descrambled, and thereafter, transmitted to the MPEG decoder 124 to be decoded.

Sequentially, the network access module 114 is described in detail. The network access module 114 is used to connect to the external computer 130 via the Internet as shown in the drawing, and is composed of, for example, an Ethernet module. As described above, since the M-JPEG encoder 113 encodes and generates digital moving picture data in a format widely used as the transmission standard for moving picture data in the Internet technology, the digital moving picture data generated by the M-JPEG encoder 113 is transmitted to the Internet through a network access module 114, received by the external computer 130, and displayed on the screen of a computer using specific reproduction software.

Meanwhile, the user of the external computer 130 may set the internal operation of the digital convergent recorder 100 by manipulating menu items or buttons on the screen of the computer. The user may control the selection and internal flow of digital moving picture data as well as the simple functions of the convergent recorder 100, for example, power on/off. Ultimately, there are advantages in that the user of the digital convergent recorder 100 of the present invention may conveniently control the convergent recorder 100 from a remote place via the Internet and may implement a Remote Monitoring System (RMS).

For example, through the remote control of the user, it is selected whether the M-JPEG encoder 113 encodes the output data of the A/V signal ADC 111 or the output data of the MPEG decoder 124. Accordingly, the selection and switching of the internal paths occurs, so that contents displayed on the screen of the external computer 130 are switched to the screens captured by an observation camera, digital broadcast screens (tuner 1 and tuner 2) and analog broadcast screens. Furthermore, by user's remote control, it is selected whether the ATAPI 125 transmits, to the HDD device 126, either the output data of the MPEG encoder 112 or the digital broadcast data, so that the selection and switching of the internal paths occurs.

A process of setting the internal operation of the digital convergent recorder 100 corresponding to the user manipulation on the screen of the external computer 130 is described in detail. A control command is transmitted to the network access module 114 via the Internet according to, in general, the Transmission Control Protocol/Internet Protocol (TCP/IP) corresponding to a user manipulation performed on the external computer 130 (e.g., "menu manipulation" or "button press"), and the network access module 114 converts the control command into an internal instruction by its own conversion rule and transmits the internal instruction to the interior, i.e. a system controller (not shown), of the digital convergent recorder 100 through a specific serial communication, for example, Universal Synchronous Receiver/Transmitter (UART), Recommended Standard 232C (RS232C) or IIC (Inter-IC Communication). Accordingly, the system controller properly controls the components.

The control command is a command that is linked to specific application software displayed on the screen of the external computer 130 or menu items, buttons and text provided in an Internet browser, and the command is transmitted to the network access module 114 via the Internet according to a general TCP/IP protocol to correspond to user manipulation. Meanwhile, depending on implementation, the control command is set to be the same as the internal instruction, that is, the data to be directly used in the specific serial communication. In this case, there is an advantage in that the network access module 114 may be simply constructed. However, in the present specification, this case is modeled on the case where the network access module 114 converts the control command into an internal instruction according to an identity transform rule.

Figure 2:
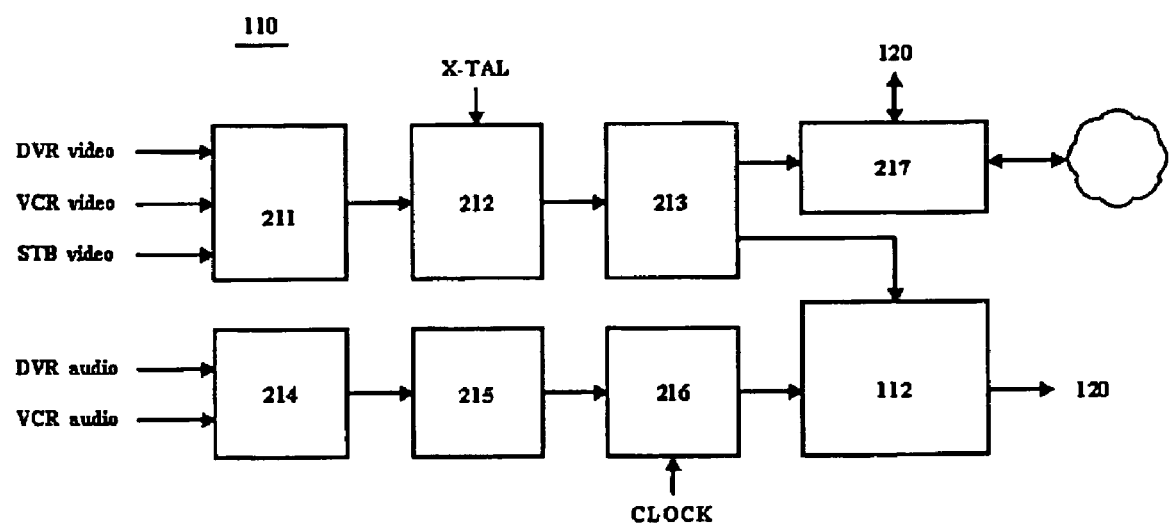
FIG. 2 is a block diagram showing the internal construction of a DVR module according to an embodiment of the present invention.

FIG. 2 is a block diagram showing the internal construction of the DVR module 110 according to an embodiment of the present invention. In particular, FIG. 2 is illustrated to show that the DVR module 110 separates into and individually processes a video part and an audio part for the input signals, i.e. analog broadcast signals and observation camera signals. Switches 211 and 214 are used in the DVR module 110 to select and switch the video signals (DVR video, DCR video and STB video) and audio signals (DVR audio and VCR audio), respectively. A video ADC 212 and an audio ADC 216 are used to obtain digital video data and digital audio data from the video signals and the audio signals, respectively.

In the video signal processing part, a buffer 213 is used to compensate for a difference in operation speed between the video ADC processing and the MPEG and M-JPEG encoding. In the audio signal processing part, an audio amplifier 215 is used to control volumes. Meanwhile, it is shown in the drawing that the PVR module 120 and the M-JPEG module 217 perform bi-directional operations. In detail, the digital moving picture data is transmitted to the M-JPEG module 217 from the PVR module 120, and the user control command or internal instruction is transmitted to the PVR module 120 from the M-JPEG module 217 through, for example, RS-232C.

INDUSTRIAL APPLICABILITY

According to the digital convergent recorder of the present invention, the DVR and PVR, which have been applied to different fields, are combined together through a common data compression format and a common operational scenario, so that there is an advantage in that a synergic effect in product operations and commercial value may be achieved.

The invention claimed is:

1. A digital convergent recorder, comprising:
tuners 121 and 122 for receiving digital broadcast signals, which broadcast signals are constructed according to a first moving picture compression format, from an outside thereof and for outputting digital broadcast data for the digital broadcast signals;
an Analog-to-Digital (AD) converter 111 for receiving analog Video/Audio (A/V) signals, for converting the analog A/V signals into digital A/V signals and for outputting the digital A/V signals;
a first moving picture encoder 112 for encoding the output digital A/V signals of the AD converter into a first moving picture data according to a first moving picture compression format and for outputting the first moving picture data;
a storage medium access unit 125 for receiving the digital broadcast data and the first moving picture data, for storing the digital broadcast data and the first moving picture data in a storage device, and for outputting moving picture file data from the storage device;
moving picture decoders 123 and 124 for receiving the digital broadcast data and the moving picture file data, for decoding the digital broadcast data and the moving picture file data into a uncompressed moving picture data according to a first moving picture decoding format corresponding to the first moving picture compression format, and for outputting the uncompressed moving picture data;
a second moving picture encoder 113 for encoding the output digital A/V signals of the AD converter and the uncompressed moving picture data of the moving picture decoders into a second moving picture data according to a second moving picture compression format that is suitable for Internet transmission and has a compression ratio higher than that of the first moving picture compression format, and for outputting the second moving picture data; and
a network access unit 114 for transmitting the second moving picture data from the second moving picture encoder to an outside thereof via the Internet.

2. The digital convergent recorder according to claim 1, wherein the first moving picture compression format is a Moving Picture Experts Group-2 (MPEG-2) Transport Stream (TS) compression format, and the second moving picture compression format is a Motion-Joint Photographic Experts Group (M-JPEG) compression format.

3. The digital convergent recorder according to claim 1, wherein the storage medium access unit 125, in response to a control command transmitted via the network access unit 114 from an outside thereof, selects one from and switches between the digital broadcast data and the first moving picture data so as to be stored in the storage device.

4. The digital convergent recorder according to claim 1, wherein the second moving picture encoder 113, in response to a specific control command transmitted via the network access unit 114 from an outside thereof, selects one from and switches between the digital output signals of the AD converter and the uncompressed moving picture data so as to be encoded according to the second moving picture compression format.

5. The digital convergent recorder according to claim 1, wherein the tuners 121 and 122 include a plurality of tuner modules corresponding to different broadcast services, select one from and switch between the plurality of tuner modules in response a specific control command transmitted via the network access unit 114 from an outside thereof, and output the digital broadcast data from the selected tuner module.

6. The digital convergent recorder according to any of claims 3 to 5, wherein the network access unit 114 is provided with the control command according to the Transmission Control Protocol/Internet Protocol (TCP/IP) from the outside, converts the control command into an internal instruction, and transmits the internal instruction to an interior of the digital convergent recorder via a serial communication.

7. The digital convergent recorder according to claim 1, wherein the digital broadcast data and the moving picture file data include scrambled data, and wherein the moving picture decoders 123 and 124 include a cryptographic module 123 for descrambling the scrambled data included in the digital broadcast data and the moving picture file data and outputting the descrambled data, and a decoding module 124 for decoding the output data of the cryptographic module into a uncompressed moving picture data according to the first moving picture decoding format and for outputting the uncompressed moving picture data.

* * * * *